3,168,279
BALL VALVE HAVING OFFSET THROUGH
PASSAGE
John Harry Anderson, Burlington, Wis., and Werner K.
Priese, Barrington, Ill., assignors to Hills-McCanna
Company, Carpentersville, Ill., a corporation of Illinois
Continuation of application Ser. No. 830,873, July 31,
1959. This application June 29, 1962, Ser. No. 206,512
9 Claims. (Cl. 251—181)

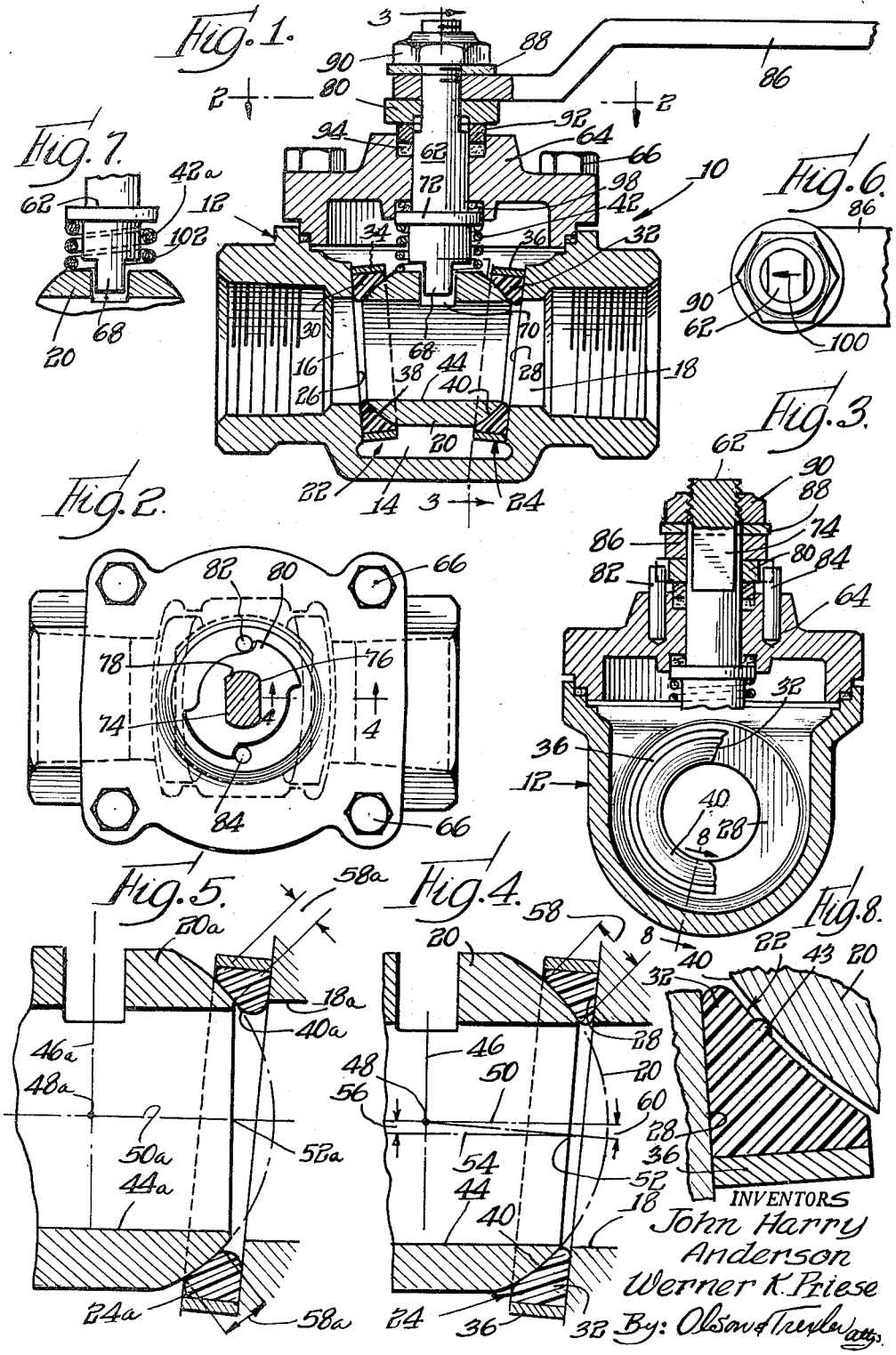

The present invention relates to ball valves. This application is a continuation of copending application Serial No. 830,873, filed July 31, 1959, now abandoned.

One object of the invention is to provide a new and improved ball valve that will operate with sustained efficiency over a long service life without adjustment to provide and maintain an optimum engagement of the valve ball with coacting valve seats which will produce highly effective and lasting seals between the valve ball and the seats.

Another object is to provide, in an improved ball valve in which linear displacement of a valve ball and coacting seats in one direction effects a progressive firming of the engagement of the seats with the ball, an improved valve construction which provides for full, unrestricted fluid flow through the bore in the valve ball when the valve is open and which provides for both the open and closed positions of the valve, areas of mutual contact and sealing pressures between the valve seats and the valve ball which are circumferentially uniform and which extend across substantially the full width of the valve seats.

Another object is to provide a ball valve of the above character having an improved construction which produces and assures effective and lasting seals between the valve ball and the valve seats, one or all of which can be formed of a yieldable material, thus providing not only an extremely reliable valve of this character but also a wide range of advantages stemming from the adaptability of the valve to the construction of the valve ball or valve seats or both from either rigid or yieldable materials which provide in the service for which the valve is designed special advantages, such, for example, as resistance to corrosion, ease of valve operation, resistance to wear, and the like.

Another object is to provide a ball valve having an improved construction which obviates any necessity for precise machining of the valve seats while at the same time providing as an incident to assembling the valve in a straightforward manner an immediate and fully effective sealing of the valve seats against the valve ball and which without adjustment operates with exceptional reliability over a long service life to maintain the full effectiveness of the seal of each valve seat against the valve ball. A related object is to provide an improved ball valve as recited in the preceding object which is inherently well adapted to the use of valve seats formed of materials which are not suited to be formed or machined with precision to exact dimensional specifications.

A further object is to provide the features and advantages recited in the above objects in a ball valve having a new and improved construction which facilitates economical manufacture and convenient servicing of the valve.

Other objects and advantages of the invention will become apparent from the following description of the exemplary embodiment illustrated in the drawings, in which:

FIGURE 1 is a longitudinal sectional view of a ball valve embodying the invention;

FIG. 2 is a plan view taken along the line 2—2 of FIG. 1;

FIG. 3 is a transverse sectional view taken generally along the irregular line 3—3 of FIG. 1;

FIG. 4 is a fragmentary sectional view on an enlarged scale taken along the line 4—4 in FIG. 2 and showing the valve ball in open position and in engagement with one coacting valve seat, and illustrating in phantom the relationship of the ball to the valve seat when the valve is closed;

FIG. 5 is a view similar to FIG. 4 which illustrates by way of contrast the relationship which would prevail between the valve ball and the valve seats except for one of the features of the invention;

FIG. 6 is a fragmentary top view of the valve;

FIG. 7 is a fragmentary detail view showing the valve spring encased in a corrosion resistant covering; and FIG. 8 is an enlarged fragmentary sectional view taken along the line 8—8 of FIG. 3.

Referring to the drawings in greater detail, the ball valve 10 forming the exemplary embodiment of the invention illustrated comprises valve body or housing means 12, FIG. 1, defining an internal valve chamber 14 and two passages 16, 18 opening into opposite sides of the chamber in opposed alignment with each other. As shown, the outer ends of the passages 16, 18 are counterbored and internally threaded for connection with coacting pipes or other conduits (not shown) to be connected by the valve.

A rotatable valve ball 20 having a basically spherical shape is disposed in the chamber 14 between the inner ends of the passages 16, 18, as shown. Opposite sides of the ball valve 20 are engaged by a pair of annular valve seats 22, 24 encircling the inner ends of the respective passages 16, 18.

In accordance with the present invention, provision is made for producing and continuously maintaining optimum sealing engagements of the respective seats 22, 24 with the valve ball 20 throughout an extended service life of the valve while at the same time obviating any necessity for adjusting the valve while it is in service. As will presently appear the construction of the valve inherently avoids the application of excessive pressure to the valve seats while at the same time automatically and continuously compensating for any receding of the valve seat surfaces or the opposed ball surfaces or both due to wear or to deformation of the material defining these surfaces, to the end that optimum mutual engagements of the valve ball and valve seats are preserved. These operating characteristics of the valve adapt the valve to construction of the valve seats from a wide choice of materials; including hard, brittle materials and yieldable materials subject to cold flow; thereby enabling the valve designer to select a structural material for the valve seats which is the most advantageous from the standpoints of corrosion resistance and the like in the service in which the valve is to be used.

Having reference to the exemplary valve 10 illustrated, the two annular seats 22, 24 are slidably supported on two flat support surfaces 26, 28 formed on the body means 12 in encircling, generally transverse relation to the inner ends of the respective passages 16, 18 and converging somewhat in relation to each other in a lateral direction with respect to the passages 16, 18.

Preferably, the planes of the respective surfaces 26, 28 would upon being extended in the direction in which they converge (downwardly with reference to FIG. 1) intersect each other with an apex angle of 10 degrees. In other words, each of the support surfaces 26, 28 is inclined at an angle of five degrees with respect to the linear direction in which the surfaces converge. The two annular valve seats 22, 24 slidably supported on the respective surfaces 26, 28, are dimensioned diametrically to define central openings in the seats conforming in size to the passages 16, 18.

In the illustrated embodiment of the invention the valve seats 22, 24 are formed of a yieldable material, such, for example, as "Teflon." Because of its chemical and physical properties "Teflon" provides many advantages when used as a basic structural material of valve seats in valves used to control the flow of some corrosive fluids. However, Teflon is only one example of materials, both yieldable and rigid, which can be used to advantage in forming seats of the improved valve, depending upon the particular service and environment in which the valve is to be used.

The annular valve seats 22, 24 are formed of annular rings 30, 32 of Teflon. Teflon is subject to "cold flow" or deformation under pressure. The Teflon rings 30, 32 are confined against radial expansion due to "cold flow" by annular bands of metal 34, 36 closely encircling the Teflon rings and forming component elements of the valve seats.

The Teflon rings 30, 32 of the respective valve seats have direct slidable engagement with the two converging support surfaces 26, 28. The inner peripheries of the rings 30, 32 are shaped to form, respectively, annular sealing surfaces 38, 40 extending substantially the full axial width of the rings and shaped to conform to and fit against the external spherical surface of the valve ball 20. For this purpose, the valve seat surfaces 38, 40 are shaped to have the form of annular segments of a spherical surface having a radius of curvature similar to the radius of the valve ball.

Optimum pressure contact of the valve seats 22, 24 with the valve ball 20 is produced and continuously maintained by continuously but yieldably biasing the valve balls and valve seats toward the converging ends of the support surfaces 26, 28, which causes the valve seats to be urged by the camming action of the surfaces 26, 28 into sealing engagement with the valve ball. For this purpose a helical compression spring 42 is mounted in the valve to engage the ball 20 to urge the ball in the direction in which the support surfaces 26, 28 converge. The force of the spring 42 is transmitted through the ball to the seats 22, 24.

The yieldability as well as the biasing action of the spring 42 contributes to a "liveliness" or responsiveness of the action which holds the valve ball and the ball seats in mutual engagement to the actual existing condition of the ball and seats. On one hand, the biasing action of the spring, due to its yieldability, will not apply excessive pressure forces to either the ball or the valve seats. On the other hand, the resiliency of the spring 42 and its ability to "follow through" with any movement of the ball in the direction in which the surfaces 26, 28 converge provide for continuing optimum engagement of the valve seats with the valve ball even though the ball engaging surfaces 38, 34 of the seats or the opposing external surface of the ball or both recede from their initial levels due to wear or cold flow of the materials used. Similarly, in the event of swelling or enlargement of the parts in use, which can occur when certain structural materials are used in the presence of certain liquids, excessive pressures are avoided by the yieldability of the spring 42 and the geometry of the parts in maintaining an optimum mutual engagement of the valve ball and the coacting seats.

Some materials, such as Teflon, which are otherwise well suited for use in the construction of the valve seats 22 and 24 as explained are not susceptible as a practical matter of being machined with great accuracy to define valve seat surfaces 38, 40 which conform precisely to arcuate segments of a truly spherical surface. Moreover, the matter of machining any material to define precisely accurate valve seat surfaces 38, 40 is expensive. Yet, at the same time it is highly desirable to avoid leakage of the valve due to an imperfect fitting of the valve seat surfaces 38, 40 against the valve ball.

While the operating characteristics of the improved valve are such that any inaccuracies in the shape of the valve seat surfaces can be overcome by operating the valve to "wear-in" the misfitting surfaces to produce a leakproof seating of the valve seats against the valve ball, any necessity for using this procedure to ready a valve for service is obviously undesirable, particularly when valve seats are replaced in the field.

In this connection, it is significant that the construction and operating characteristics of the improved ball valve provided by the invention obviate any necessity for precise machining of the valve seat surfaces 38, 40 while at the the same time providing for a fully effective, leakproof sealing of the valve seats 22, 24 against the valve ball 20 immediately upon assembling the valve in a simple, straight-forward manner either in the factory or in the field.

Thus, as shown in the enlarged sectional view of FIG. 8, the Teflon ring 32 of the valve seat 22, which is identical to the valve seat ring 24, is machined to define on a medial annular segment of the ball opposing surface 40 a circular initial sealing bead 43 protruding only a few thousandths of an inch above the surface 40 and having a shape in transverse section, FIG. 8, conforming to a segment of a circle having a small radius of curvature. Preferably, the bead 43 rises from six to eight thousandths of an inch above the surface 40 and has a radius of curvature in transverse section which is of the order of one thirty-second of an inch.

Upon assembly of the valve 10, the crest of the head 43 on each valve seat surface engages the opposing ball 20 to effect "line" contact of the valve seat with the ball. The optimum force with which the valve seat is automatically and continuously urged against the valve ball as described is concentrated on the very narrow circular area of engagement of the bead 43 with the ball. The intensity of the pressure thus produced on the mutually engaged surfaces of the opposing seat and ball is sufficient to depress any high spots on the bead sufficiently to avoid any circumferential discontinuities in the effective sealing contact of the seat with the ball.

As a result, the valve becomes immediately effective upon being assembled to produce vacuum or bubble tight engagements of both seats 22, 24 with the valve ball.

Moreover, any receding of ball engaging surface portions of the valve seats due to wear, a yielding of the seat structure, or both is automatically followed up in the manner described to continuously maintain the effectiveness with which the seats are sealed against the ball.

The bead 43 on each valve seat is formed by the simple expedient of providing a recess of the proper size in the cutting tool used in forming the valve seat surface as a surface of revolution.

The valve 10 illustrated is opened and closed by rotating the valve ball 20 through a 90 degree angle about an axis parallel to the linear direction in which the valve seat support surfaces 26, 28 converge toward each other. The structure provided for turning the ball 20 between its open and closed positions will be described presently.

As shown in FIGS. 1, 3 and 4, the valve ball 20 defines an internal bore 44 extending through the ball and oriented in relation to the ball so that opposite ends of the bore are moved into and out of registration with the central openings through the respective valve seats 22, 24 as an incident to the turning of the ball between its open and closed positions.

Further provision is made in the construction of the improved valve, in which the valve seats are slidably mounted on converging support surfaces in the manner described, for providing, for both the open and closed positions of the valve ball, areas of mutual contact and sealing pressures between the valve seats and the valve ball which are circumferentially uniform and which extend across substantially the full width of the individual valve seats.

Thus, in accordance with the invention, the internal bore 44 is oriented in relation to the valve ball 20 so that the centers of opposite ends of the bore are displaced toward the converging ends of the valve seat support surfaces 26, 28 away from a plane extending through the center of the ball in perpendicular relation to the linear direction in which the surfaces 26, 28 converge toward each other.

Having reference to FIG. 4, the rotary axis of the ball 20 is designated by the number 46. As previously described, the axis 46 about which the ball 20 is rotated between its open and closed positions extends through the center of the ball in parallel relation to the linear direction in which the seat support surfaces 26, 28 converge. Hence, for the purpose of the present description, the line 46 representing the rotary axis of the ball in FIG. 4 may also represent the linear direction in which the surfaces 26, 28 converge.

A plane extending through the center 48 of the ball 20 in perpendicular relation to the rotary axis of the ball is represented in FIG. 4 by the line 50. The center of one end of the bore 44 is designated in FIG. 4 by the number 52 and a line extending between the centers of opposite ends of the bore is designated by the number 54. The center of the end of the bore 46 opposite from that specifically illustrated in FIG. 4 is similarly offset from the plane 50 as indicated in FIG. 4 by the parallel relationship of the plane 50 to the line 54 extending between the centers of opposite ends of the bore. The actual displacement of opposite ends of the internal bore 44 from the plane 50 is designated in FIG. 4 by the number 56.

In the preferred construction illustrated, the internal bore 44 in the ball 20 has a straight cylindrical form and is offset from the center of the ball toward the converging ends of the valve seat support surfaces 26, 28 so that the axis of the bore coincides with the previously mentioned line 54 extending through the centers of the opposite ends of the bore.

Offsetting of the centers of opposite ends of the bore 44 from the plane 50 toward the converging ends of the surfaces 26, 28 provides a substantially concentric alignment of opposite ends of the bore with the central openings through the respective valve seats 22, 24, as shown in FIGS. 1 and 4, when the ball 20 is in open position. The width of the area of mutual contact between the ball engaging surface 40 of the valve seat 24, for example, and the ball 20, when the latter is in open position, is designated in FIG. 4 by the number 58. Because of the concentric relationship produced between the seats 22, 24 and opposite ends of the bore 44 by virtue of the offset positions of opposite ends of the bore from the plane 50, the width 58 of the area of effective engagement of the seat 24, for example, with the ball when the latter is in open position is circumferentially uniform around the valve seat. Not only does this provide circumferential uniformity in the seating of the valve ball in the valve seats but it also effects a uniform circumferential distribution of the forces with which the valve seats engage the valve ball to the end that exceptionally effective fluid sealing of the seats against the valve ball is provided by the circumferential uniformity in the sealing pressures produced between the valve seats and the valve ball when the latter is in either its open or closed position. The closed position of the valve ball 20 is represented in phantom in FIG. 4.

The degree to which opposite ends of the bore 44 is offset from the plane 50 as described to obtain the desired concentricity between the ends of the bore and the valve seats 22, 24 is a function of the angle of divergence of the valve seat support suraces 26, 28 or the inclination of these individual surfaces relative the direction (represented by the line 46) in which the surfaces 26, 28 converge. As shown in FIG. 4, the offsetting of the bore ends is such that a line drawn from the center 48 of the valve ball through the center 52 of one end of the bore 44 makes an angle 60 with the plane 50 which is equal to the inclination of the surface 28 relative to the line 46, such inclination being equal to one-half the angular divergence of the two support surfaces 26, 28.

It is particularly noteworthy that the offset relationship provided between the ends of the bore 44 and the plane 50 as described produces not only the highly advantageous circumferential uniformity in the engagement of the individual valve seats with the valve ball referred to above, but it also extends the area of mutual contact between the ball and each seat over the full effective width of the valve seat leaving no portion of the ball opposing surface of the seat disengaged from the ball when the latter is in open position. Thus as shown in FIG. 4, the width of engagement 58 of the ball 20 with the seat 24 extends across the full width of the ball opposing seat surface 40 when the valve is open as well as when the valve is closed. This is particularly significant in valves in which the seats are formed of a material which is subject to "cold flow" under pressure.

The fact that the full ball opposing widths of the valve seats are covered by the ball, when the valve is open, together with the circumferential uniformity in the application of ball pressure to the valve seats effectively eliminates troublesome distortion and asymmetrical deformation of valve seats formed of Teflon or other yieldable material.

These characteristics of the improved valve also provide a uniform circumferential distribution of any wear which may occur on the valve seats to the end that the sealing efficiency of the seats is not impaired.

Moreover, any receding of the ball opposing surfaces 38, 40 of the valve seats that may occur due to wear or to yielding of the valve seat structure is automatically compensated for by action of the previously described valve structure in continuously maintaining an optimum pressure of the valve seats on the valve ball.

To better appreciate the circumferential uniformity provided in the mutual engagement of the seats 22, 24 with the ball 20 in the improved valve 10, it is helpful to observe with reference to FIG. 5 the non-uniformity which would prevail except for features provided by the invention. In FIG. 5 structural components corresponding to those shown in FIG. 4 previously described are designated with the same reference numerals with the addition of the suffix "a." The valve structure illustrated in FIG. 5 differs from that shown in FIG. 4 only in that the straight cylindrical valve bore 44a is concentric with the center 48a of the valve ball 20a and the centers of opposite ends of the bore 44a lie in the plane 50a extending through the center 48a of the ball in perpendicular relation to the linear direction 46a in which the valve seat support surfaces converge.

This construction, lacking the above disclosed feature of the present invention produces asymmetrical engagement of the valve seat 24a, for example, with the ball 20a when the valve is open as shown in FIG. 5, and as a result the width of the ball opposing surface 40a of the valve seat 24a in active engagement with the ball 20a varies from a maximum width at the lower side of the seat, with reference to FIG. 5 to a greatly reduced width at the diametrically opposite side of the seat. Consequently the pressure with which the ball 20a engages the opposing surface 40a of the seat 24a varies progressively around the valve seat.

This not only makes for an inferior sealing of the seat against the ball but it also tends to cause asymmetrical distortion of the valve seat. This is particularly true when the valve seat is formed of a material such as Teflon, which is subject to cold flow. The areas of the seat subject to greater pressure may be deformed to a greater extent than those subject to less pressure.

Moreover, it is especially noteworthy that the lack of concentricity which prevails between the valve bore 44a and the valve seats in the construction illustrated in FIG. 5 leaves a portion of the ball opposing area 40a of the seat 24a exposed when the valve is open. This exposed area of the valve seat surface 40a may tend to protrude inwardly in relation to the adjacent portions of the surface 40 opposed by the ball 20a. The result would be a material shortening of the service life and effectiveness of the valve, shortcomings which are obviated by the improved valve construction previously described in relation to FIGS. 1 to 4.

The ball 20 in the improved valve 10, FIGS. 1 to 4 is turned between its open and closed positions as described by means of a rotary valve stem 62 mounted in a removable cover 64 forming a part of the valve body means 12. The cover 64 is removably secured by cap screws 66 to the main portion of the body means 12 to cover the side of the valve chamber 14 toward which the valve seat support surfaces 26, 28 diverge from each other. Hence, removal of the cover 64 provides direct and unrestricted access to the chamber 14 for inspecting and servicing the valve ball and valve seats. After removing the cover 64, the ball 20 and valve seats 22, 24 can be lifted out from between the diverging ends of the surfaces 26, 28.

The inner end of the valve stem 62 protrudes inwardly from the cap 64 and defines a generally flat tang 68 which projects into a slot 70 in the ball 20 to transmit rotary motion from the stem to the ball. The previously mentioned helical spring 42 encircles the inner end of the stem 62 between the ball 20 and an annular shoulder 72 on the stem as shown in FIG. 1.

The opposite end of the stem 62 projects outwardly from the cover 64 and is milled on opposite sides to form two parallel flats 74, 76, FIGS. 2 and 3. The flatted end of the stem 62 extends through an elongated slot 78 in an elongated, transverse throw plate 80 which projects a substantial distance beyond opposite sides of the stem as shown in FIGURE 2. A pair of limit stop pins 82, 84 are fixed into the cover 64 as shown in FIG. 3 to project outwardly into interfering relation to opposite ends of the throw plate 80, FIG. 2, to limit rotation of the throw plate and stem 62 to a radial angle of approximately 90 degrees, stopping rotary movement of the stem 62 in positions corresponding to the open and closed positions of the valve ball 20.

The slotted inner end of a radial operating handle 86 is fitted on the projecting end of the stem 62 in overlying relation to the throw plate 80 and covered by a washer 88 which is engaged by a nut 90 threaded onto the extreme end of the stem as shown in FIGURES 1 and 2.

A short cylindrical gland 92 encircles the stem 62 between the cover 64 and packing 94 fitted into the top of the cover 64 around the stem. Packing 98 is fitted around the inner end of the stem 62 between the collar 72 and the cap 64.

This structural arrangement provides for simultaneous tightening of the two packings 94, 98, encircling the inner and outer ends of the stem, as an incident to tightening of the single nut 90 which urges the stem shoulder 72 and the gland 92 toward each other to exert compressive forces on the packings. The action of the single nut 90 in tightening the inner packing 98 as well as the outer packing 94 is of decided advantage in maintaining the fluid tight integrity of the valve.

Proper operation of the valve even by unskilled personnel is facilitated by means of a red indicating arrow 100 conspicuously displayed on the outer end of the stem 62 and oriented in relation to the stem to have a parallel alignment with the two passages 16, 18 when the valve is open and to point laterally at a right angle to the passages 16, 18 when the valve is closed.

The spring 42 located within the valve housing 12 can be protected from contact with the fluid in the housing by encasing the spring in a material resistant to the chemical action of the fluid. FIG. 7 shows a sectional view of a spring 42a used in this environment and encased in an impervious covering 102 of Teflon, which is immune to attack by most fluids.

It will be appreciated that the invention is not necessarily limited to the specific embodiment illustrated but includes variants and structural alternatives within the spirit and scope of the invention as defined by the claims.

The invention is claimed as follows:

1. A ball valve comprising, in combination, valve body means defining a valve chamber and two passages opening into said chamber from opposite sides thereof in mutually opposed alignment, means defining two generally flat support surfaces extending transversely across the inner ends of said respective passages and converging toward each other in a linear direction, a rotary valve ball of generally spherical shape disposed in said chamber between said passages, a pair of annular valve seats slidably supported on said respective surfaces and defining annular ball sealing surfaces engaging opposite sides of said ball, the ball sealing surface of each seat being defined on annular structure of the seat that extends between the ball sealing surface of the seat and the adjacent support surface and has as viewed in transverse radial section a shape and size that are substantially uniform circumferentially, a spring biasing said ball and said seats in said one direction to continuously urge said seats into firm sealing engagement with said ball, means for rotating said ball between open and closed positions thereof, said ball defining a bore extending therethrough to connect said passages when the ball is in the open position thereof, and opposite ends of said bore being displaced toward the converging edges of said surfaces away from a plane extending through the center of said ball in perpendicular relation to said linear direction to provide a concentric alignment of said bore ends with said seats when said ball is in the open position thereof.

2. A ball valve comprising, in combination, body means defining two passages having adjacent ends spaced apart in general alignment with each other, generally flat support surfaces encircling the adjacent ends of said respective passages in generally transverse relation thereto and converging toward each other in a linear direction, a pair of annular valve seats formed of yieldable material and closely encircled respectively by circular elements movable with the seats and adapted to confine the seats against radial expansion, said seats slidably engaging said respective surfaces in encircling relation to said adjacent ends of said passages to be supported directly by said surfaces, a valve ball rotatably disposed between said seats in engagement therewith, each of said seats defining an annular ball sealing surface confronting said ball and having a width which is substantially uniform circumferentially, the ball sealing surface of each seat being defined on annular structure of the seat that extends between the ball sealing surface of the seat and the adjacent support surface and has a size and a shape in transverse radial section that are substantially uniform circumferentially, resilient means biasing said ball and said seats in the direction in which said surfaces converge to continuously urge said seats firmly against said ball by the camming actions of said surfaces on said seats, means for rotating said ball between angularly displaced positions for opening and closing the valve, said ball defining a bore therethrough oriented to connect said passages when the ball is in one position thereof, and opposite ends of said bore being offset in the direction in which said surfaces converge from a plane extending through the center of the ball perpendicularly to the direction of convergence of said surfaces.

3. In a ball valve, the combination of body means defining two passages having adjacent ends spaced apart, two valve seat supports disposed in proximity to said adjacent ends of the respective passages in generally transverse relation thereto and converging toward each other in one direction, a pair of centrally-open valve seats slidably mounted on said respective supports in general alignment with said respective passages and defining annular ball sealing surfaces, a valve ball disposed between said seats in engagement with said ball sealing surfaces on both seats, the ball sealing surface of each seat being defined on annular structure of the seat that extends between the ball sealing surface of the seat and the coacting support for the seat and has a size and a shape in transverse radial section that are substantially uniform all the way around the seat, means for rotating said ball between open and closed positions, said ball defining a bore therethrough oriented to connect said passages when the ball is in open position, and opposite ends of said bore being offset from the center of said ball in said direction in which said supports converge to effect a concentric alignment of said bore ends with said respective seats when the ball is in open position.

4. A ball valve comprising, in combination, body means defining a valve chamber and passages opening thereinto, valve seat supports disposed proximate to the inner ends of said passages in generally transverse relation thereto and converging somewhat toward each other in one direction, a pair of annular valve seats movably supported on said supports in general alignment with said respective passages and defining annular ball sealing surfaces, a rotary valve ball disposed between said seats in engagement with said ball sealing surfaces thereon, the ball sealing surface of each seat being formed on annular structure of the seat which extends between the ball sealing surface of the seat and the coacting support for the seat and which has a shape and size in transverse radial section that are substantially uniform all the way around the seat, means for rotating said ball between open and closed positions, resilient means continuously yet yieldably urging said ball and said seats in said one direction, said ball defining a bore extending therethrough for alignment with said seats when the ball is in the open position thereof, and said bore being offset from the center of said ball in the direction in which said supports converge.

5. A ball valve comprising, in combination, body means including a detachable cover defining a valve chamber and two passages extending into said chamber from opposite sides thereof, means defining two generally flat support surfaces disposed adjacent the inner ends of said passages in transverse relation thereto and converging toward each other in a linear direction, two annular valve seats slidably supported on said respective surfaces in general alignment with said passages, a valve ball disposed between said valve seats in engagement therewith, resilient means biasing said ball and said seats toward the converging edges of said surfaces to urge said seats into firm sealing engagement with said ball by camming action of said surfaces on said seats, each valve seat defining an annular ball sealing surface confronting said ball in sealing engagement therewith, the ball sealing surface of each seat being formed on annular structure of the seat that extends between the ball sealing surface of the seat and the coacting support surface for the seat and has a size and shape in transverse radial section that are substantially uniform all the way around the seat, operating means coacting with said ball to rotate the ball between open valve and closed valve positions thereof, said ball defining a bore therethrough oriented to connect said passages when the ball is in said open valve position thereof, and opposite ends of said bore being offset toward the converging edges of said surfaces from a plane extending through the center of said ball in perpendicular relation to said linear direction to effect concentric alignment of opposite ends of the bore and said seats when said ball is in open position.

6. A ball valve comprising, in combination, body means defining two passages having adjacent ends spaced apart, two valve seat supports disposed in proximity to said adjacent ends of said respective passages in generally transverse relation thereto and converging toward each other in one direction, a pair of centrally-open valve seats slidably mounted on said respective supports in general alignment with said respective passages, a valve ball disposed between said seats in engagement therewith, each of said seats defining an annular ball sealing surface of substantial width shaped to seal against said ball, the ball sealing surface of each seat being formed on annular structure of the seat which extends between the ball sealing surface for the seat and the coacting support for the seat and which has a shape and size in transverse radial section that are substantially uniform all the way around the seat, each valve seat defining an annular bead extending circumferentially along the ball sealing surface of the seat and rising slightly therefrom toward said ball to engage and seal against the ball prior to engagement of said sealing surface on the seat with the ball, means for rotating said ball between open and closed positions, resilient means biasing said ball and said seats in said one direction in which said supports converge, said ball defining a bore therethrough oriented to connect said passages when the ball is in open position, and opposite ends of said bore being offset from the center of said ball in the direction in which said supports converge to effect a concentric alignment of said bore ends with said respective seats when the ball is in open position.

7. A ball valve comprising, in combination, body means defining a valve chamber and two opposed passages opening into said chamber, means defining two support surfaces encircling the inner ends of said respective passages in generally transverse relation thereto and converging toward each other in one direction, a valve ball rotatably disposed betwen the inner ends of said passages, two annular valve seats defining central openings therethrough and being slidably disposed on said respective surfaces in general alignment with said passages, each of said valve seats comprising an annular ball seal formed of a yieldable polymeric material and being slidably disposed on the adjacent support surface in direct sealing engagement therewith and in direct sealing engagement with the opposing annular portion of said ball, each of said seats including a seal confining element movable with the ball seal of the seat along the coacting support surface in closely encircling relation to the seal, each seal confining element having a circumferentially continuous construction that positively constrains the seal confining element against radial expansion and having an extent along the axis of the coacting seal which spans the corresponding axial extent of the seal positively to preclude radial expansion of the seal under load while at the same time providing for sliding movement of the seal on the coacting support surface, the ball seal and seal confining element of each seat each having a shape and a size in transverse radial section which are uniform around the circumference of the seat, a biasing spring acting directly on said ball to urge said ball in the direction in which said support surfaces converge to effect sliding movement of said seals along said support surfaces therefor to tighten the seals against said ball and against said respective support surfaces, said ball defining a passage connecting bore extending therethrough; said bore, said passages, and the openings through said valve seats being substantially equal in size; opposite ends of said bore in the valve ball being displaced in said one direction in which said surfaces converge from a plane extending through the center of the ball in perpendicular relation to the direction in which the surfaces converge to effect a concentric alignment of opposite ends of the bore with said seats and with said passages when the ball is in its open valve position, and actuating means coacting with said ball to rotate the latter between open and closed valve positions to connect and disconnect said passages.

8. A ball valve comprising body means defining a valve chamber and two opposed generally circular passages opening into said chamber, means defining two support surfaces encircling the inner ends of said respective passages in generally transverse relation thereto and converging toward each other in one direction, a rotatable valve ball disposed between the inner ends of said passages, two structurally independent valve seats slidably disposed on said respective support surfaces, each of said valve seats including an annular ball seal formed of a yieldable polymeric material and having a shape and size in transverse radial section which are uniform circumferentially around the seal, each ball seal being slidably supported on the adjacent support surface in direct sealing engagement therewith and having direct sealing engagement with said ball, each seat including a seal constraining element closely encircling the ball seal of the seat, each seal constraining element having a circumferentially continuous construction that positively constrains the seal confining element against radial expansion under load and having an extent along the axis of the coacting seal which spans the corresponding axial extent of the seal to positively preclude radial expansion of the seal under load while at the same time providing for sliding movement of the seal on the coacting support surface, means forcing said ball and said seats in said direction in which said support surfaces converge to produce a pressure loading of the seals which effects tight sealing relationships of said seals to said ball and to said respective support surfaces, said ball defining a bore therethrough having opposite ends offset in the direction in which said support surfaces converge from a plane extending through the center of the ball in perpendicular relation to said direction to effect a concentric alignment of opposite ends of the ball with said seats and said passages when the ball is in the open valve position thereof, and actuating means for rotating said ball between valve open and valve closed positions thereof.

9. A ball valve comprising, in combination, body means defining a valve chamber and two passages opening into said chamber, a flow control valve ball rotatably disposed within said chamber, means for rotating said ball between valve open and valve closed positions thereof, two valve seat supports disposed in proximity to the inner ends of said respective passages in generally transverse relation thereto and converging toward each other in one direction, two centrally-open valve seats movably supported on said respective supports in general alinement with the inner ends of said respective passages, each of said seats defining an annular ball sealing surface confronting said ball to seal thereagainst, said ball sealing surface of each seat being defined on annular structure of the seat that extends between the ball sealing surface of the seat and the coacting support for the seat and has a size and a shape in transverse radial section that are substantially uniform all the way around the seat, means coacting with said ball and said seats to force the ball and seats in said one direction in which said supports converge to tighten said seats against the ball, said ball defining a bore therethrough oriented to connect said passages when the ball is in its open valve position, and opposite ends of said bore being offset in said one direction from a plane extending through the center of the ball perpendicularly to said one direction to effect upon rotation of the ball to its open valve position a concentric alinement of said bore ends with said respective seats.

References Cited in the file of this patent
UNITED STATES PATENTS

| 1,738,450 | Ryan | Dec. 3, 1929 |
| 1,941,839 | Johansson | Jan. 2, 1934 |
| 2,179,684 | Brown | Nov. 14, 1939 |
| 2,373,628 | Gleeson | Apr. 10, 1945 |
| 2,534,577 | Courtot | Dec. 19, 1950 |
| 2,757,896 | Sangster | Aug. 7, 1956 |
| 2,912,217 | Freeman | Nov. 10, 1959 |
| 2,945,666 | Freeman | July 19, 1960 |
| 2,963,263 | Sanctuary | Dec. 6, 1960 |
| 2,985,422 | Anderson | May 23, 1961 |
| 2,986,372 | Yocum | May 30, 1961 |
| 3,030,068 | Priese | Apr. 17, 1962 |

FOREIGN PATENTS

| 403,389 | Great Britain | Dec. 18, 1933 |
| 508,337 | Great Britain | June 29, 1939 |
| 617,444 | Great Britain | Feb. 7, 1949 |
| 684,621 | Great Britain | Dec. 24, 1952 |
| 759,218 | Great Britain | Oct. 17, 1956 |